United States Patent
Hansen et al.

(10) Patent No.: US 10,451,515 B2
(45) Date of Patent: Oct. 22, 2019

(54) ELECTRIC FIELD EXPANSION SYSTEM FOR LOW VOLTAGE CONDUCTIVITY INSPECTION

(71) Applicant: Electro Scan, Inc., Scaramento, CA (US)

(72) Inventors: Charles A. Hansen, Carmichael, CA (US); Mark Grabowski, Pewaukee, WI (US); Cory Peters, Sacramento, CA (US)

(73) Assignee: Electro Scan, Inc., Sacramento, CA (US)

( * ) Notice: Subject to any disclaimer, the term of this patent is extended or adjusted under 35 U.S.C. 154(b) by 21 days.

(21) Appl. No.: 15/707,890

(22) Filed: Sep. 18, 2017

(65) Prior Publication Data

US 2018/0080847 A1     Mar. 22, 2018

Related U.S. Application Data

(60) Provisional application No. 62/396,676, filed on Sep. 19, 2016.

(51) Int. Cl.
| | | |
|---|---|---|
| G01M 3/18 | (2006.01) | |
| G01M 3/24 | (2006.01) | |
| G01M 3/40 | (2006.01) | |
| G01M 5/00 | (2006.01) | |

(52) U.S. Cl.
CPC .............. *G01M 3/18* (2013.01); *G01M 3/246* (2013.01); *G01M 3/40* (2013.01); *G01M 5/0025* (2013.01); *G01M 5/0083* (2013.01)

(58) Field of Classification Search
CPC .......... G01M 3/18; G01M 3/246; G01M 3/40; G01M 5/0025; G01M 5/0083
See application file for complete search history.

(56) References Cited

U.S. PATENT DOCUMENTS

| | | | |
|---|---|---|---|
| 6,172,940 B1 * | 1/2001 | McConnell | G01H 3/12 181/122 |
| 6,301,954 B1 | 10/2001 | Schuberth | |
| 6,407,562 B1 * | 6/2002 | Whiteman | G01R 1/06766 324/754.07 |
| 9,304,055 B2 * | 4/2016 | Hansen | G01M 5/0025 |

OTHER PUBLICATIONS

"Next Generation Water Leak" Detection and Water Loss Services, 2016, Electro Scan Inc., pp. 1-8 (Year: 2016).*
Electro Scan, Inc.; Next Generation Water Leak Detection and Water Loss Services; Jan. 17, 2016; Brochure.

* cited by examiner

*Primary Examiner* — David M. Gray
*Assistant Examiner* — Michael A Harrison
(74) *Attorney, Agent, or Firm* — Heisler & Associates

(57) ABSTRACT

Extensions exited from electrodes of an electroscan probe, allowing for operation in a wide range of pipe sizes, particularly large diameter pipes, by extending the maximum effective distance of the electric fields generated by the probe. The extensions preferably extend radially from each of the electrodes, and are sized to bring tips of the extensions close to the pipe wall. The extensions can be joined by lanyards to assist in keeping them spaced apart. At least some extensions preferably have bulbous tips, preferably at least partially formed of non-conductive material to keep adjacent extensions from touching each other, especially extensions coupled to different electrodes. The extensions, in one embodiment, are threaded into collars adjacent to each electrode and selected to have a length appropriate for the pipe diameter.

16 Claims, 4 Drawing Sheets

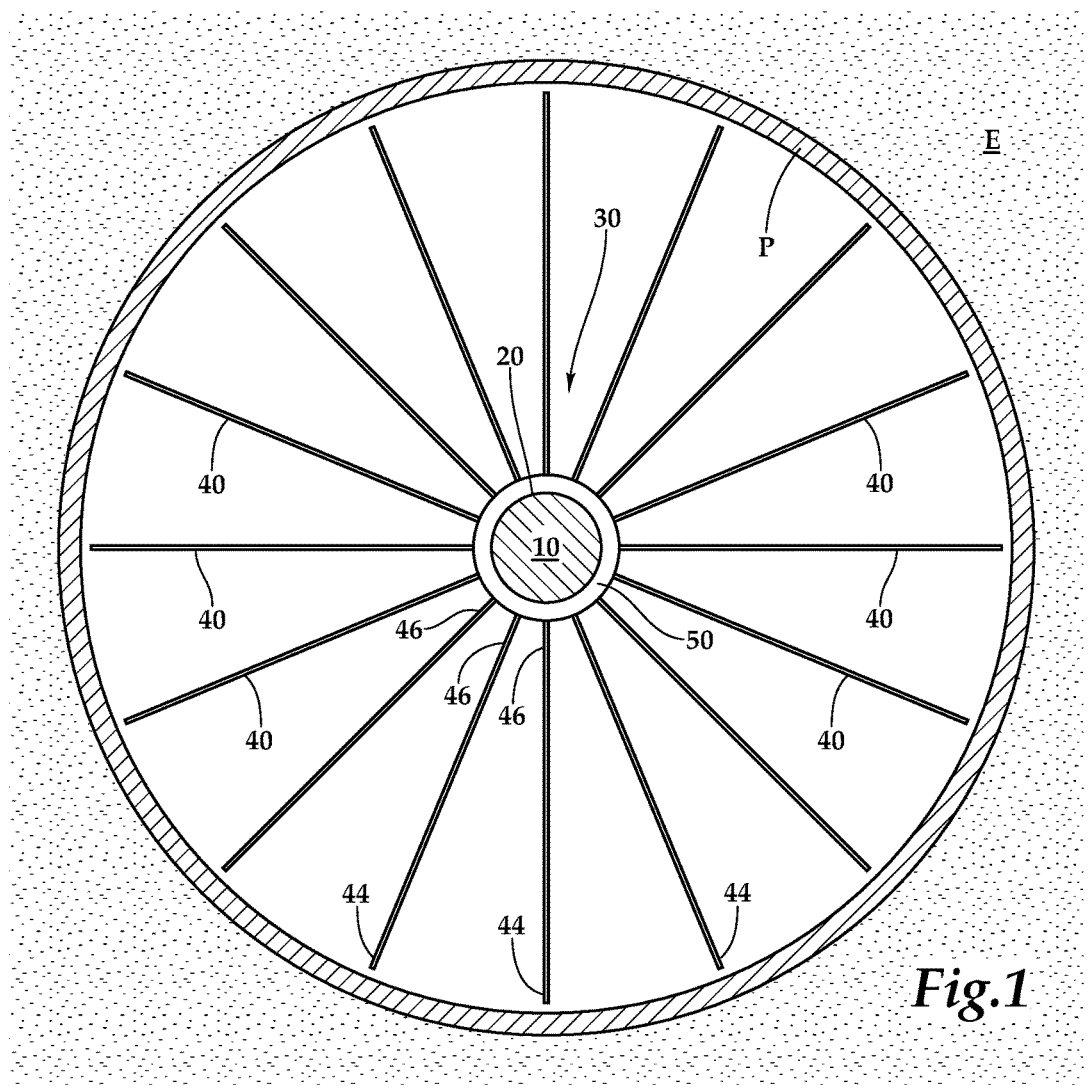
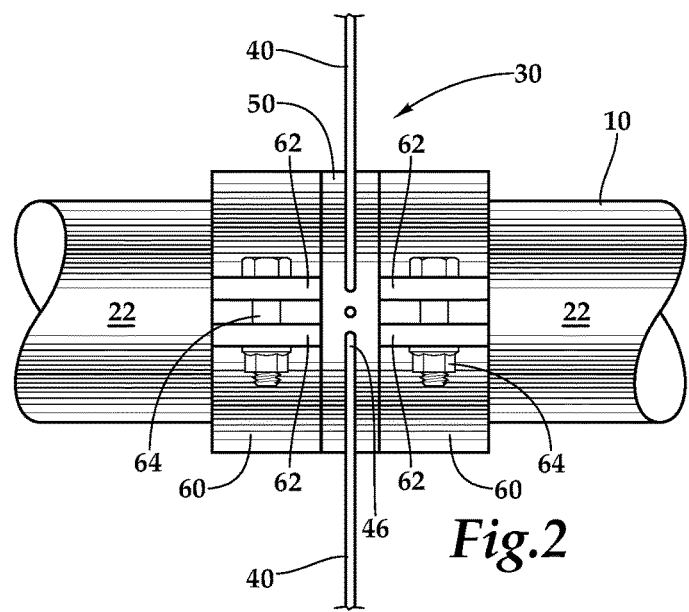

ELECTRIC FIELD EXPANSION SYSTEM FOR LOW VOLTAGE CONDUCTIVITY INSPECTION

CROSS-REFERENCE TO RELATED APPLICATIONS

This application claims benefit under Title 35, United States Code § 119(e) of U.S. Provisional Application No. 62/396,676 filed on Sep. 19, 2016.

FIELD OF THE INVENTION

The following invention relates to systems and methods for detecting defects in underground pipes of various sizes and materials, such as sewer pipes, which have a potential to leak. More particularly, this invention relates to methods which involve establishing an electric current that flows between ground adjacent to the pipe and an interior of the pipe, which circuit increases in current amplitude when an electric probe passing through a pipe filled with electrically conductive fluid approaches defects in the pipe, such as leaks. Such a system is often called electroscan. In particular, this invention relates to the electrode systems of said probes and probes which can be modified to be effective in pipes of different diameters.

BACKGROUND OF THE INVENTION

The detection of leaks in sewer systems and other underground pipes of various sizes and materials is often difficult, but necessary and important; leaks in such pipes can increase costs associated with operation and maintenance, as well as potentially create hazards. Consequently, a need exists for effectively identifying leaks in such pipes. This need is especially great for large diameter pipes, which tend to be more hazardous and difficult to inspect. Moreover, they are especially susceptible to infiltration. Unfortunately, one of the most effective forms of leak detection, electroscan, has only been applied to small diameter pipes.

Large diameter pipes are generally inspected for defects by visual inspection methods, such as closed-circuit television (CCTV). Cameras aid in the identification of structural defects, mapping of service tap and valve locations, and so on. However, defects which leak can be very difficult to identify and are easily missed since the camera cannot always see where water is exfiltrating, and many defects may be too small or too difficult to locate visually. Asbestos cement pipes or pipes which have been lined using a cured-in-place process further exacerbate these issues. Additionally, minerals that commonly deposit on the walls of the pipe may obstruct the view of a leaking defect. Furthermore, the flow in large diameter pipes cannot be easily shut off or re-routed, and as such, large diameter pipes are nearly always active. When partially full, the camera cannot view the entirety of the pipe interior, and defects under the water line will most likely go unnoticed.

A more effective method, electroscan, has already vastly improved leak detection for smaller diameter pipes. Described in detail in ASTM Standard F2550-13, the electroscan method for defect detection measures variations in electric current flow through walls of the pipe as part of a series circuit including a voltage source and an electric current sensor, which collects data as the probe moves through a known position within the pipe. Probes such as those disclosed in U.S. Pat. Nos. 6,301,954 and 9,304,055 are incorporated herein by reference.

One such probe beneficial for use in conducting this electroscan is provided by Electro Scan, Inc. of Sacramento, CA. Such probes effectively concentrate the electric current over a relatively short length of the pipe in which the probe is located, so that electric current intensity data gathered by the electroscan method can be accurately correlated with the condition of the pipe directly adjacent the probe. Additionally, if a pipe is lined with a cured-in-place method, electroscan is able to identify defects that typically go unnoticed by other methods such as cameras. With its significant advantages over CCTV and other inspection methods, electroscan has been adapted for large diameter pipes.

An electroscan system includes an electric probe that has multiple cylindrical electrodes attached, each generating an electric field. The probe is inserted into a pipe wherein the electric fields must reach the walls of the pipe with sufficiently high potential energy, in order to accurately locate any defects in the pipe wall. Because the potential energy of an electric field weakens rapidly with distance, the cylindrical shaped electrodes must be close to the pipe wall to be effective. A conventional electric probe sized to fit a large diameter pipe would generally be too large to achieve insertion into said pipe. Furthermore, it would weigh too much to be easily handled, and obstruct too much fluid flow. Thus, a need exists to adapt the electrodes in an electroscan system to large diameter pipes.

SUMMARY OF THE INVENTION

In the present invention, apparatus and methods are given in which specially shaped electrode extensions increase the potential energy of an electric field generated by the probe near the wall of a buried pipe. The resulting increase in the effective distance of the electric field allows the probe to be used in pipes of a greater range of applications, including large diameter and uniquely shaped pipes .

The electrically conductive electrode extensions preferably radiate from the electrodes of the probe, and carry the electric current closer to the pipe wall. The resulting electric field has a consistent electric potential near the pipe wall. Each electrode preferably has a plurality of extensions, and each extension is in contact with only one electrode.

The extensions are stiff enough to support the weight of the probe, and flexible enough to deflect when passing an obstruction. After being deflected, the extension returns to its original shape. To prevent contact between extensions of separate electrodes, there is electrical insulation between them, such as in the form of a lanyard spanning space between the extensions circumferentially and bulbous tips on the extensions, formed at least partially of non-conductive material.

The electrode extensions attach and reattach so they can be replaced, or different sized extensions can be used. This also allows the probe to be used in different sized pipes.

The electrode extensions have a small cross-sectional area compared to that of the probe and pipe, allowing fluid to easily flow past.

OBJECTS OF THE INVENTION

Accordingly, a primary object of the present invention is to provide an apparatus and system and method for allowing the use of electroscan technology in large diameter pipes, without requiring larger diameter probes.

Another object of the present invention is to provide an apparatus and system for increasing the electric potential of the electric field near the pipe wall.

Another object of the present invention is to provide an apparatus and system for decreasing the cross-sectional area of the probe.

Another object of the present invention is to provide an apparatus and system for stabilizing the location of the probe within the pipe.

Another object of the present invention is to provide an apparatus and system to allow the physical boundaries of the probe to move when passing an obstruction and to subsequently return to their original position.

Another object of the present invention is to provide an apparatus and system for allowing the use of the same probe in a variety of different size, shape, and material pipes.

Another object of the present invention is to provide an apparatus and system for preventing discrete electrodes from making contact with each other.

Another object of the present invention is to provide an apparatus and system for evenly distributing the electric fields generated by the probe.

Other further objects of the present invention will become apparent from a careful reading of the included drawing figures, the claims and detailed description of the invention.

BRIEF DESCRIPTION OF THE DRAWINGS

FIG. 1 is a front view of the electric probe and the electrode extensions within a buried underground pipe.

FIG. 2 is a detailed side view of the electrode extension system attached to a probe with a collar and clamps.

DESCRIPTION OF THE PREFERRED EMBODIMENT

Figure 3:
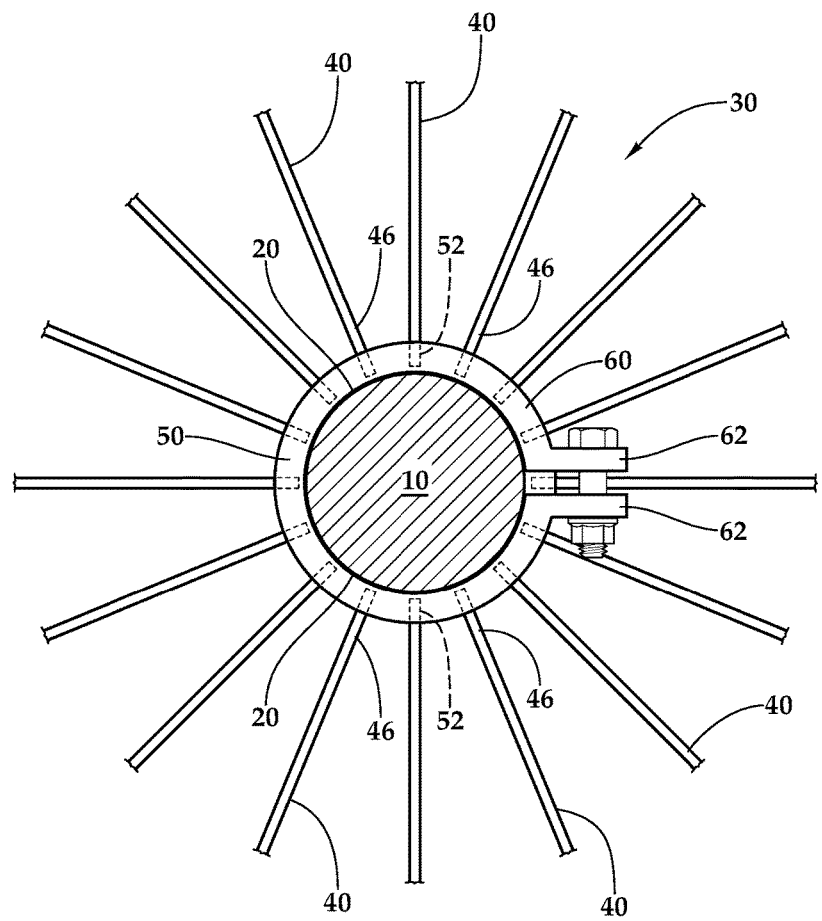
FIG. 3 is a detailed front view of the electrode extension system attached to a probe with a collar and clamps.

Referring to the drawings, wherein like reference numerals represent like parts throughout the various drawing figures. The system is consistent with a prior art system described in ASTM (ASTM International, formerly known as "American Society for Testing and Materials") Standard F2550-13 described as "Standard Practice for Locating Leaks in Sewer Pipes By Measuring The Variation of Electric Current Flow Through the Pipe Wall." While this ASTM standard applies to locating leaks in sewer pipes, electroscan systems and electrode extensions are not limited to only sewer pipes.

FIG. 1 generally depicts an electric probe 10, comprising electrodes 20, and utilizing an electrode extension system 30 according to this invention. The electric probe 10 is shown within a buried pipe P in this figure, buried in the earth E.

The electric probe 10 is preferably of a type similar to that disclosed in U.S. Pat. Nos. 6,301,954 and 9,304,055, incorporated herein by reference. However, all suitable electric probes are contemplated. For example, appropriate electric probes may be directed toward inspecting water pipes, sewer pipes, or other pipes of various sizes and materials carrying at least minimally electrically conductive fluid. Smaller sized probes are preferred, although larger sized probes can be appropriate.

With particular reference to FIGS. 1-3, basic details of the electrode extension system 30 are described. A set of electrode extensions 40 is coupled to a single electrode 20 through an electrically conductive collar 50. As one collar 50 attachment method, the collar 50 is juxtaposed between two cylindrical clamps 52 that are mounted on the electrode 20. A bolt 64 or other fastener spans ears 62 on the clamps 60 to tighten the clamps 52 down onto one of the electrodes 20 for electrically conductive contact therebetween. The clamps 60 prevent the collar 50 from effectively moving.

Figure 4:
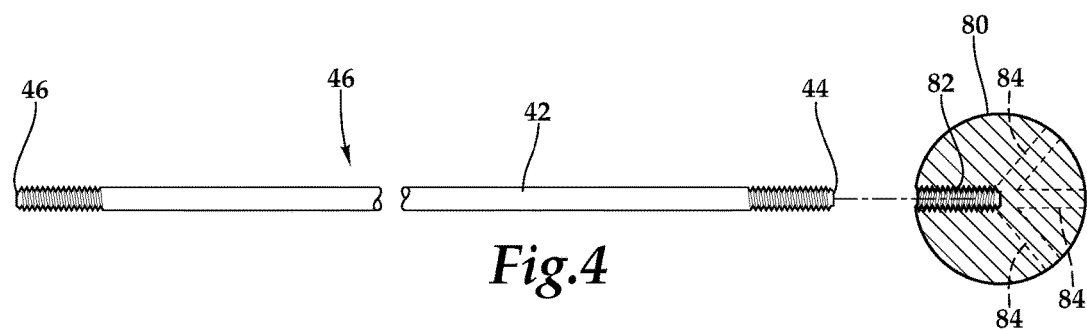
FIG. 4 is a side view of an electrode extension.

Turning to FIG. 4, an electrode extension 40 is covered with a thin layer of relatively flexible rubber insulation 42 between a tip 44 and a root 46 which are typically not insulated. The tip 44 of the electrode extension 40 is not covered by the insulation 42. The electrode extension 40 is preferably made of spring steel for its elastic properties, but other materials can be suitable. Any electrically conductive material that is sufficiently durable can be considered, including different types of steel, and other alloys. While more elastic materials are preferred, stiffer materials may be used. In such a case, a hinge of some form would likely be incorporated to allow the electrode extension to deflect, such as when encountering an obstacle.

The electrode extension 40 preferably has a circular cross-section. Other cross sections are considered, including those that change along the length of an electrode extension 40. Electrode extensions 40 can vary in number and arrangement, but typically extend radially from collars 50 on each of the electrodes 20 of the probe 10.

Other ways of connecting or coupling electrode extensions 40 to an electrode 20 are considered. For example, an electrode extension 40 may be threaded at one end that screws into a threaded hole directly in an electrode 20. Each electrode extension 40 may be permanently connected or removably coupled individually to the electrode 20, either directly or through a collar 50.

More specifically, the probe 10 in a typical embodiment includes three electrodes 20 along a length thereof, with the probe 10 being of elongate form and with two guard electrodes 20 closer to a distal end 18 and a proximal end 16 of the probe 10, and with a sensing electrode 20 between the two guard electrodes 20. A sidewall 22 of the probe 10 spaces these three electrodes 20 from each other. Most preferably with this invention, each of the electrodes 20 includes a plurality of extensions 40 emanating therefrom. The probe 10 could be manufactured to include the electrode extensions 40 of the electrode extension system 30 built into the probe 10, or the electrode extension system 30 could be provided as a retrofit system which can be retrofitted onto an existing electrode probe 10.

Each of the electrodes 20 is generally in the form of an electrically conductive material which form parallel rings oriented in planes that are perpendicular to an elongate central axis of the probe 10 extending between the ends 16, 18. These electrodes 20 have an outermost circumferential surface which is desired to be brought into close proximity with a wall of a pipe P being inspected. When a larger diameter pipe P is involved, rather than merely build a larger probe, with this invention the electrode extension system 30 is utilized to effectively bring each of these electrodes into close proximity with walls of the large diameter pipe P.

Figure 6:
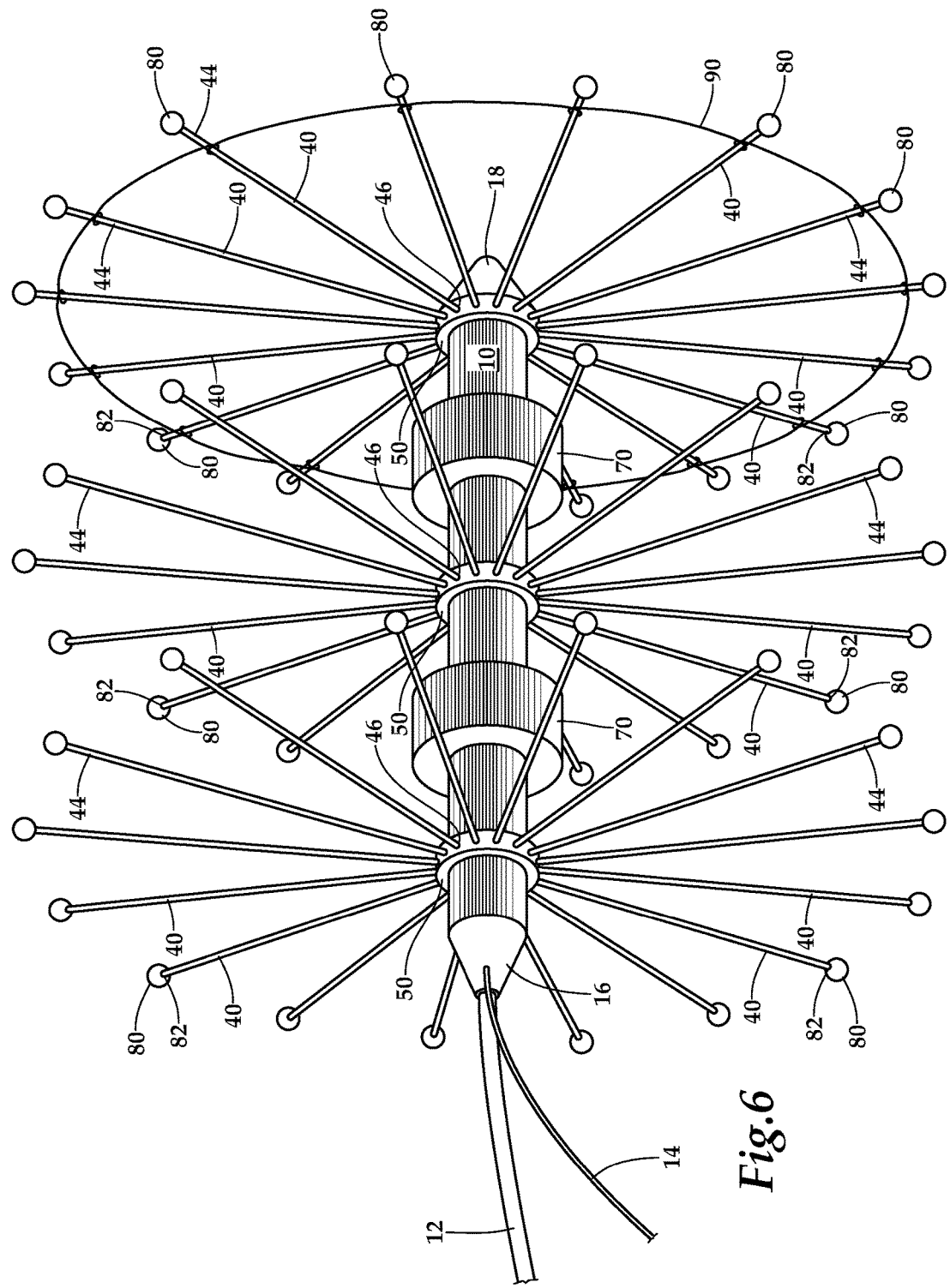
FIG. 6 is an additional perspective view of the electric probe fitted with three sets of electrode extensions as it would typically be used.

Close proximity can include physical contact with the walls of the pipe P, but achieves effectiveness in sensing pipe P defects when the electrodes 20 are electrically at least within a couple of inches of the pipe P wall. The electrode extension system 30 achieves this close proximity to the pipe P wall in two ways. First, the extensions 40 themselves extend out from the electrodes 20 of the probe 10 toward the wall of the pipe P. Additionally, the probe 10 will rest on a lower surface of the pipe P in most circumstances under forces of gravity. Extensions 40 below the probe 10 will typically abut the surface of the large diameter pipe P and hold the probe 10 generally near a center of the pipe P. Then, the electrode extensions 40 above the probe 10 extend up from the probe 10 to within close proximity to upper portions of the pipe P wall. To assist in probe 10 centering, at least one float 70 can be added to bring the probe closer to neutral buoyancy (FIG. 6).

As an example, if a twenty-four inch diameter pipe P is to be inspected and if the probe 10 has a diameter of four inches, with the electrodes 20 on the probe 10 including the two guard electrodes 20 and the sensing electrode 20 also having a diameter of four inches, the electrode extension system 30 including the electrode extensions 40 can each extend nine inches long. In such an arrangement, the probe 10 modified with the electrode extension system 30 will have an effective diameter of twenty-two inches. Typically some of the electrode extensions 40 will have tips 44 that will be in contact with the wall of the pipe P and some of the electrode extensions 40 will be up to two inches away from the wall of the pipe P.

Close proximity is thus achieved while still maintaining clearance to allow the probe 10 with the electrode extension system 30 to easily pass through the pipe P and navigate corners and other obstructions which might be associated with the pipe P. While the short distance of less than a few inches is ideal, the system 30 can be minimally effective with greater distances, such as with the tips 44 just closer to the pipe P wall than just a center of the pipe. Furthermore, by forming the electrode extensions 33 either of flexible materials (e.g. spring steel) and/or with hinge mechanisms (e.g. coil spring joints like those on a whip antenna), the electrode extensions 40 can collide with the wall somewhat and deform in a resilient manner to allow for navigation of the probe 10 through the buried pipe P even when including the electrode extension system 30.

The electrically conductive collar 50 of each set of electrode extensions 40 preferably has an inner cylindrical surface opposite an outer cylindrical surface. The inner cylindrical surface is configured so that it comes into electric contact with the electrode 20 to which it is attached, the electrode 20 either being one of the guard electrodes 20 or the sensing electrode 20. This collar 50 could be formed in two halves and allowed to come together to surround and come into contact with the electrode 20 to which it is electrically attached, or could be in the form of a flexible strap which is wrapped around the electrode 20 or a ring slid onto the probe 10 from an end 16, 18. Preferably, the inner cylindrical surface of the electrically conductive collar 50 is formed of a material which resists corrosion and which can readily achieve an electric connection to the associated electrode 20 to which it is electrically attached.

If desired, this inner cylindrical surface of the electrically conductive collar 50 could be roughened or could have a series of teeth or prongs which can be pressed tightly against the associated electrode 20 to ensure intimate physical contact and electrical connection with the associated electrode 20, even if some degree of oxidization, corrosion or other surface condition might otherwise resist making of a sound electric contact therebetween. The electrically conductive collar 50 could attach by itself without any further supports, such as by clamping directly onto the associated electrode 20 of the probe 10 (see FIG. 6). However, most preferably the electrically conductive collar 50 is sandwiched between a pair of cylindrical clamps 60 to carry the structural load securing the electrically conductive collar 50 to the associated electrode 20, rather than requiring the electrically conductive collar 50 to also make this physical connection.

If the probe 10 is built to include the electrode extension system 30 therein, the electrodes 20 themselves can merely be formed with threaded bores and the electrode extensions 40 can have threaded roots 46 which thread into these threaded bores. In such a system, electrode extensions 40 of differing lengths could be swapped out to provide the electrode system 30 for the probe 10 matching a diameter of pipe P to be inspected. If the pipe has some unique geometry which is other than circular in cross-section, electrode extensions 40 having differing lengths could be utilized together to cause tips 44 of these electrode extensions 40 to follow the unique geometry of the pipe P to be inspected. In such a manner, pipes having an oval cross-section or a square cross-section or other cross-section could be effectively inspected.

Figure 5:
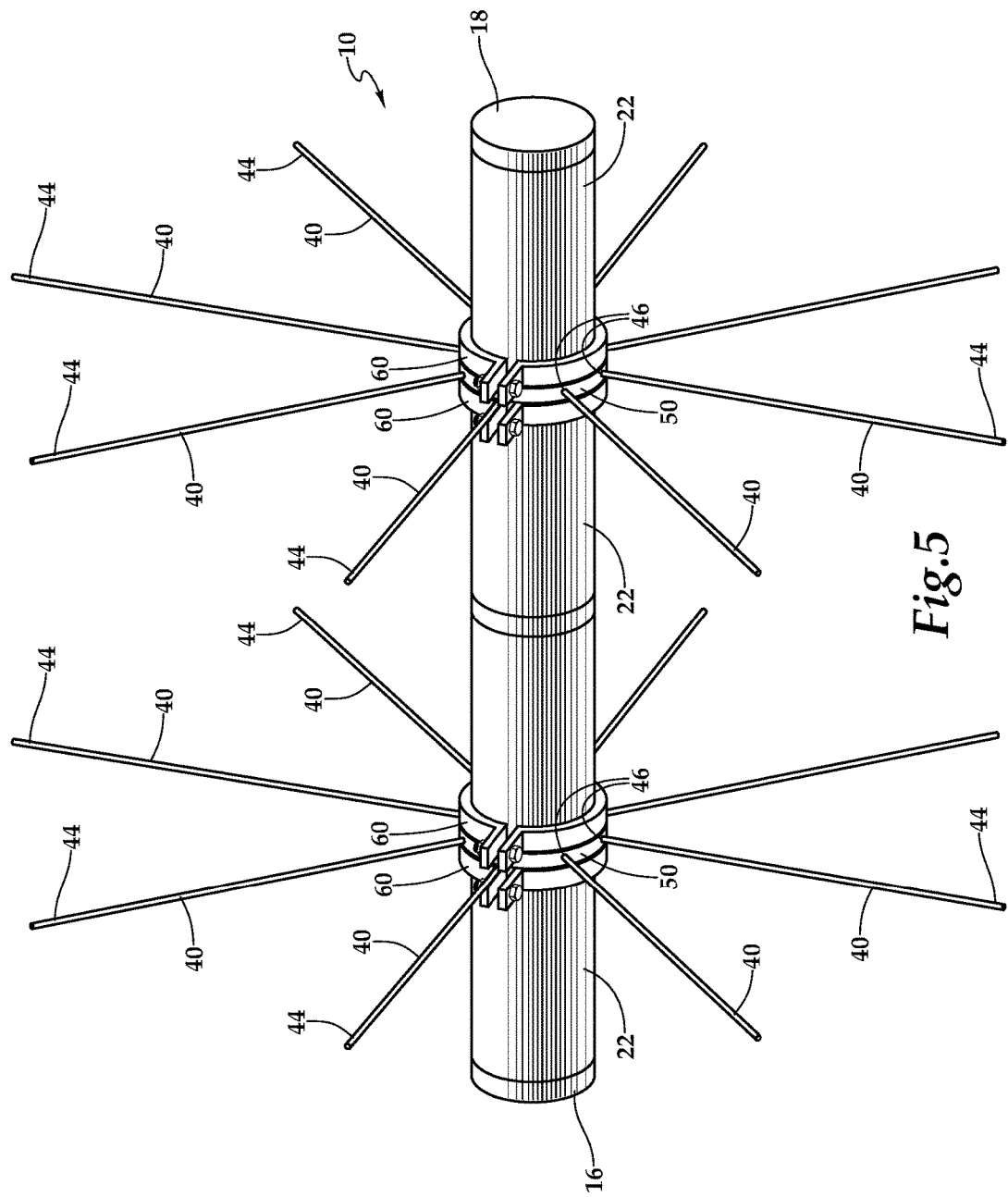
FIG. 5 is a perspective view of the electric probe fitted with two sets of electrode extensions and with a central electrode not yet fitted with electrode extensions to reveal more of the probe configuration.

With particular reference to FIGS. 4 and 5, the tips 44 of the electrode extensions 40 shown in FIG. 4 can have insulation 42 provided thereon which typically would stop short of two ends thereof. The root 46 ends would be fitted with an attachment structure to attach either to the electrically conductive collar 50, such as through threaded bores 52 (FIG. 3) or directly to one of the electrodes 20 of the probe 10. The opposite and distal tip 44 end would typically be exposed to perform the electric field establishing and sensing function of this system.

This distal tip 44 could be fitted with a bulbous appendage 80 if desired. This bulbous appendage 80 could be formed of electrically conductive material or of insulative material, provided that some portion of the distal tip is exposed sufficiently electrically to allow the electric field to emanate therefrom, such as conductive paths 86 (FIG. 4). The bulbous appendages 80 could thus act as bumpers to prevent undesirable contact between distal tips of the electrode extensions 40 with other electrode extensions 40. The bulbous appendages can be provided with threaded blind bores 82 into which threaded tips 44 of the extensions 40 can attach.

While FIG. 5 only depicts two electrode extension systems 30 on two of the guard electrodes 20, the system 30 of this invention would typically be utilized with three such electrode extension systems 30 of similar style (see FIG. 6). The tips 44 of the electrode extensions 40 can also have insulative (or potentially conductive) circumferential lanyards 90 spanning a distance therebetween, which can tend to keep adjacent distal tips of adjacent electrode extensions 40 (and especially extensions 40 of other electrodes 20) from coming into contact with each other and generally to maintain their spacing circumferentially.

As with probes of other electroscan systems, the probe 10 typically includes both a conductor 14 and a pull line 12 extending from the proximal end 16 of the probe 10. The conductor 14 completes a portion of the electric circuit in which the probe 10 is a port. The pull line 12 moves the probe 10 through the pipe P. The conductor 14 and pull line 12 could conceivably be integrated together at least partially. Preferably the extensions 40 extend radially and have equal spacing. As an alternative, the extensions 40 could extend in some other lateral but not strictly radial direction. Spacing could be less regular, but benefits from having spacing of less than twice an average spacing between each extension 40 and adjacent extensions 40 for a more uniform electric field inside of the pipe P.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A probe for establishing one portion of an electric circuit within a pipe to be scanned for defects, the probe comprising in combination:
   a proximal end opposite a distal end;
   at least one electrode on said probe;
   an elongate flexible conductor extending axially away from said proximal end of said probe, said conductor also forming a portion of the electric circuit;
   said at least one electrode electrically coupled to said elongate flexible conductor;
   at least one electrically conductive extension extending laterally from said at least one electrode between said proximal end of said probe and said distal end of said probe, and increasing an effective diameter of said at least one electrode of said probe;
   wherein a plurality of extensions extend radially from said at least one electrode; and
   wherein at least one of said plurality of extensions includes a bulbous appendage at a tip of said extension opposite a root where said extension joins to said electrode, said bulbous appendage formed at least partially from non-electrically conductive material, such that said bulbous appendage can keep said tip of said extension from coming into electric contact with other extensions extending from said probe.

2. The probe of claim 1 wherein said plurality of extensions are spaced apart with a maximum spacing between said plurality of adjacent extensions not more than double an average spacing between adjacent extensions.

3. The probe of claim 1 wherein said probe includes at least three electrodes including two guard electrodes and one electrode between said two guard electrodes, and wherein a plurality of extensions extend from each of said guard electrodes and wherein a plurality of extensions extend from said electrode between said guard electrodes.

4. The probe of claim 1 wherein said at least one electrically conductive extension is removably attachable to said probe.

5. The probe of claim 4 wherein said at least one electrically conductive extension includes a threaded root which threads into a hole for receiving said extension.

6. The probe of claim 1 wherein at least one float is attached to said probe, said float having a mass and volume selected to cause the probe to be closer to neutrally buoyant in water than the probe would be without said at least one float.

7. A probe for establishing one portion of an electric circuit within a pipe to be scanned for defects, the probe comprising in combination:
   a proximal end opposite a distal end;
   at least one electrode on said probe;
   an elongate flexible conductor extending axially away from said proximal end of said probe, said conductor also forming a portion of the electric circuit;
   said at least one electrode electrically coupled to said elongate flexible conductor;
   at least one electrically conductive extension extending laterally from said at least one electrode between said proximal end of said probe and said distal end of said probe, and increasing an effective diameter of said at least one electrode of said probe;
   wherein a plurality of extensions extend radially from said at least one electrode; and
   wherein at least one lanyard extends circumferentially and joins portions of at least some of said extensions together which are coupled to a common electrode, said lanyard joining portions of said extensions on locations upon said extensions which are spaced from said electrode from which said plurality of extensions extend.

8. A probe for establishing one portion of an electric circuit within a pipe to be scanned for defects, the probe comprising in combination:
   a proximal end opposite a distal end;
   at least one electrode on said probe;
   an elongate flexible conductor extending axially away from said proximal end of said probe, said conductor also forming a portion of the electric circuit;
   said at least one electrode electrically coupled to said elongate flexible conductor;
   at least one electrically conductive extension extending laterally from said at least one electrode between said proximal end of said probe and said distal end of said probe, and increasing an effective diameter of said at least one electrode of said probe;
   wherein said at least one electrically conductive extension is removably attachable to said probe;
   wherein said at least one electrically conductive extension includes a threaded root which threads into a hole for receiving said extension; and
   wherein a plurality of electrically conductive extensions having different lengths can each be removably attached to said at least one electrode of said probe, such that an effective diameter of said at least one electrode of said probe can be adjusted by selecting an extension having a different length.

9. The probe of claim 8 wherein a collar of electrically conductive material is attached to said at least one electrode, said collar including a plurality of threaded bores extending radially thereinto, each of said threaded bores receiving a root of an electrically conductive extension.

10. The probe of claim 9 wherein said collar is formed of at least two halves which are removable attachable to each other and tightenable to hold said collar tightly and in electric contact with said at least one electrode.

11. The probe of claim 9 wherein lateral clamps clamp onto said probe and to said collar to hold said collar in position adjacent to said at least one electrode.

12. A method for establishing an electric circuit within a pipe to be scanned for defects, the pipe having a larger diameter than a probe forming a portion of the electric circuit, the method, including the steps of placing the probe within a pipe to be scanned, the probe having a proximal end opposite a distal end, a least one electrode on the probe, an elongate flexible conductor extending axially away from the proximal end of the probe the conductor forming a portion of the electric circuit, the at least one electrode electrically coupled to the elongate flexible conductor and a plurality of electrically conductive extensions extending laterally from the at least one electrode between the proximal end of the probe and the distal end of the probe, and increasing an effective diameter of the at least one electrode of the probe;
 selecting extensions having a sufficient length to cause their tips to be closer to a wall of the pipe than a center of the pipe when the probe is at a center of the pipe with extensions extending radially from the probe;
 attaching the extensions of said selecting step to the probe; and
 removing the extensions from the probe and attaching extensions having different lengths to the probe.

13. A method for establishing an electric circuit within a pipe to be scanned for defects, the pipe having a larger diameter than a probe forming a portion of the electric circuit, the method, including the steps of placing the probe within a pipe to be scanned, the probe having a proximal end opposite a distal end, a least one electrode on the probe, an elongate flexible conductor extending axially away from the proximal end of the probe the conductor forming a portion of the electric circuit, the at least one electrode electrically coupled to the elongate flexible conductor and a plurality of electrically conductive extensions extending laterally from the at least one electrode between the proximal end of the probe and the distal end of the probe, and increasing an effective diameter of the at least one electrode of the probe;
 selecting extensions having a sufficient length to cause their tips to be closer to a wall of the pipe than a center of the pipe when the probe is at a center of the pipe with extensions extending radially from the probe;
 attaching the extensions of said selecting step to the probe; and
 binding at least some of the plurality of extensions together with a lanyard extending therebetween on portions of the extensions spaced from the probe.

14. A method for establishing an electric circuit within a pipe to be scanned for defects, the pipe having a larger diameter than a probe forming a portion of the electric circuit, the method, including the steps of placing the probe within a pipe to be scanned, the probe having a proximal end opposite a distal end, a least one electrode on the probe, an elongate flexible conductor extending axially away from the proximal end of the probe the conductor forming a portion of the electric circuit, the at least one electrode electrically coupled to the elongate flexible conductor and a plurality of electrically conductive extensions extending laterally from the at least one electrode between the proximal end of the probe and the distal end of the probe, and increasing an effective diameter of the at least one electrode of the probe;
 selecting extensions having a sufficient length to cause their tips to be closer to a wall of the pipe than a center of the pipe when the probe is at a center of the pipe with extensions extending radially from the probe;
 attaching the extensions of said selecting step to the probe; and
 wherein said attaching step includes providing roots of the extensions with threads thereon and providing a threaded bore electrically coupled at least indirectly to the at least one electrode.

15. An improvement to a probe used to form a portion of an electric circuit to evaluate defects within an electrically conductive fluid containing pipe, with the probe located within the pipe, and the probe having at least three electrodes including two guard electrodes and an electrode between said two guard electrodes, and with an elongate flexible conductor extending axially away from a proximal end of said probe opposite a distal end, as a portion of the electric circuit, the improvement comprising:
 a plurality of extensions extending laterally from at least one of the electrodes on said probe, said extensions increasing an effective diameter of the probe to allow the probe to function more effectively within pipes having a diameter larger than the probe; and
 wherein said plurality of extensions are removably attachable to the probe.

16. The probe of claim 15 wherein a collar of electrically conductive material is attached to at least one of the electrodes of the probe with an inside diameter of said collar similar to a diameter of said electrode, and with an outside diameter of said collar provided with threaded bores extending radially thereinto, and with said plurality of extensions each having a root with threads thereon to allow said extensions to be threaded into and out of said threaded bores and said collar for removable attachability to the probe.

* * * * *